Sept. 24, 1935.  J. L. ANDERSON  2,015,329
PORTABLE CUTTING OR WELDING APPARATUS
Filed Aug. 13, 1932  2 Sheets-Sheet 1
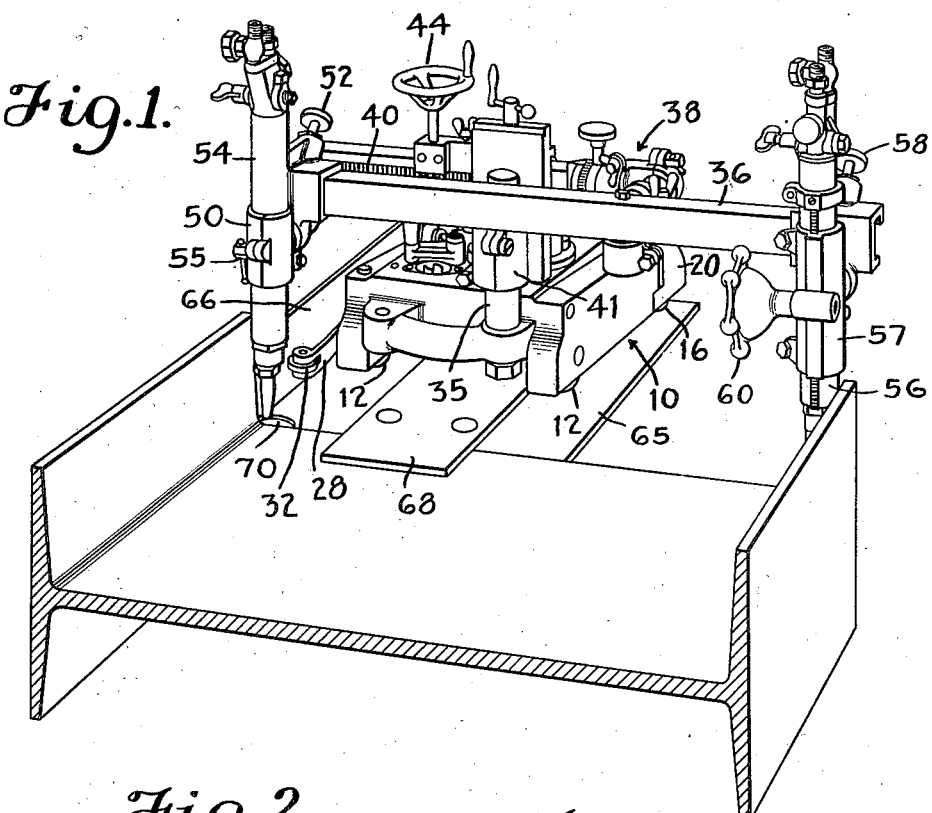
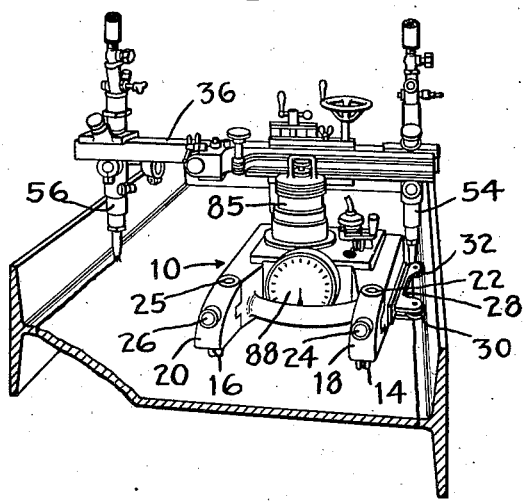
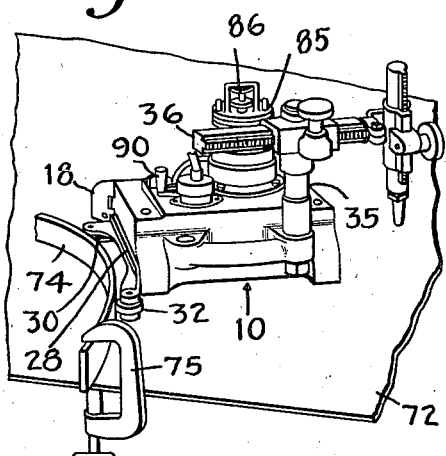
INVENTOR
James L. Anderson
BY
ATTORNEY Sept. 24, 1935.   J. L. ANDERSON   2,015,329
PORTABLE CUTTING OR WELDING APPARATUS
Filed Aug. 13, 1932   2 Sheets-Sheet 2
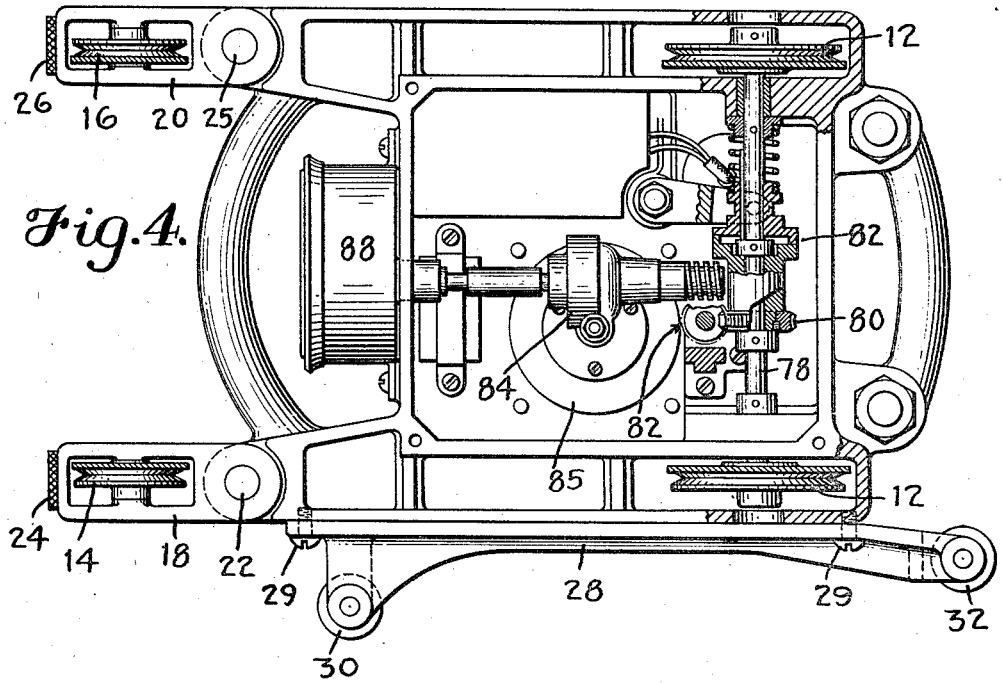
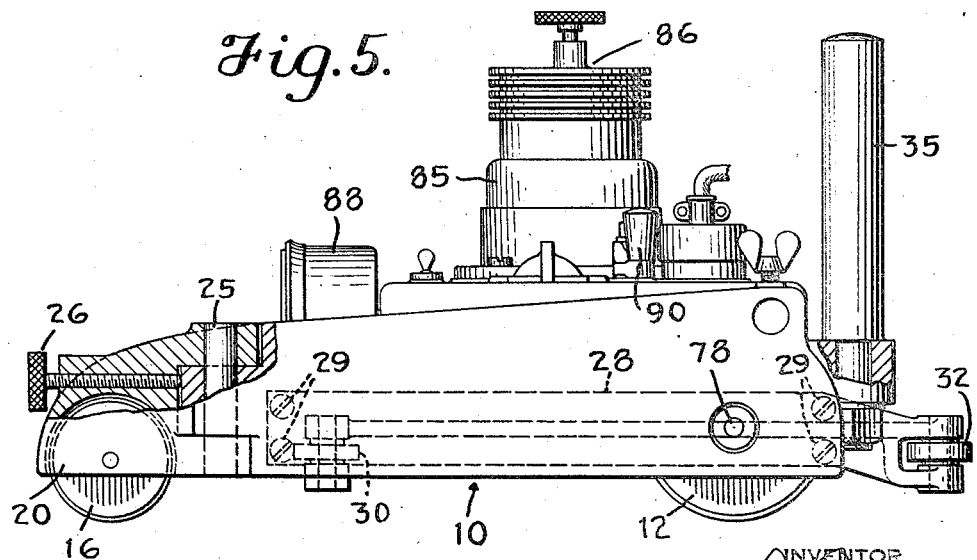

Patented Sept. 24, 1935

2,015,329

UNITED STATES PATENT OFFICE 2,015,329

PORTABLE CUTTING OR WELDING APPARATUS

James L. Anderson, Closter, N. J., assignor to Air Reduction Company, Incorporated, New York, N. Y., a corporation of New York Application August 13, 1932, Serial No. 628,663

19 Claims. (Cl. 266—23)

This invention relates to portable cutting or welding apparatus, and particularly to the guiding of self-supporting torch carriages along a beam, or other supporting surface.

Self-supporting, self-propelled torch carriages have been used for various cutting operations and have been guided by tracks or radius arms. When a radius arm is used, the carriage can be run directly on the surface of the work, but the course is limited to the arc of a circle. Tracks increase the space occupied by the cutting or welding apparatus and make it less portable.

It is an object of this invention to provide improved portable cutting or welding apparatus, of the self-supporting carriage type, which follows along a lateral guide or flange as it travels on the work or other supporting surface. An integral flange of the work or other supporting surface may serve as the guide, or an upstanding guide of suitable contour can be clamped or otherwise held in position to guide the carriage. On large pieces of work, the upstanding guide can be clamped directly against the surface of the work in position to guide the carriage as it travels on the work.

A more particular object of the invention is to provide compact and efficient portable cutting apparatus, of the self-supporting carriage type, for cutting the flanges from a beam. The invention comprises a self-supporting torch carriage with means for biasing the carriage to hug one flange of the beam as a guide as it travels lengthwise along the beam. Cutting torches are connected with the carriage in position to simultaneously cut two flanges from the beam.

The invention is useful for salvaging portions of defective beams in rolling mills. A certain percentage of the beams rolled are defective and not suitable for use. The practice in the past has been to re-melt such beams, and they have caused serious loss to the rolling mills. Very often a part of a defective beam is good. For example, an I-beam may be rolled with defective flanges, but the web of the beam may be perfect, and if the flanges are cut off the web can be salvaged as steel plate.

Other objects and advantages of the invention will appear or be pointed out as the description proceeds.

In the accompanying drawings, forming a part hereof:

Fig. 1 is a perspective view of an I-beam and apparatus for cutting the flanges from the beam, the torch hoses being removed;

Fig. 2 is a reduced perspective view showing the back of the apparatus of Fig. 1 when in operation;

Fig. 3 is a reduced perspective front view showing portable apparatus for cutting large-radius arcs, or other cuts, in accordance with this invention;

Fig. 4 is an enlarged bottom plan view of the wheeled carriage shown in Figs. 1–3; and Fig. 5 is a side elevation, partly in section, of the carriage shown in Fig. 4.

A wheeled carriage 10 has front wheels 12 secured to a power driven axle which extends across the carriage. The power driving mechanism and axle mounting will be described later in connection with Fig. 4. The carriage has rear wheels 14 and 16 (Fig. 2), which are rotatably connected to wheel carriers 18 and 20, respectively. The wheel carrier 18 is swivelly connected with the carriage by a vertical pintle 22, and the wheel carrier can be locked in any position against swivel movement by a thumb-screw 24. The wheel carrier 20 is swivelly connected with the carriage by a vertical pintle 25, and has a thumb-screw 26 for locking it against swivel movement. The axles of the wheels 14 and 16 are behind the pintles, so that when the thumb screws are released the wheels will caster.

A bracket 28 is attached to the side of the carriage by screws 29. Rollers 30 and 32 are supported by the side bracket 28 in position to roll against an upwardly extending surface while the carriage moves over a substantially horizontal surface. The rollers are intended to contact with a vertical guide surface, but will operate against any upwardly extending surface which is steep enough to provide the necessary side thrust.

A post 35 (Fig. 1) is secured to the front of the carriage. A torch supporting bar 36 is attached to an adjustable bracket 38, which has a rack 40 extending from one side. The adjustable bracket 38 is supported by a clamp 41 which engages the post 35. The bracket 38 can be shifted, with respect to the clamp 42, by a hand-wheel 44, which operates a pinion engaging the rack 40.

A torch holder 50 is clamped to the supporting bar 36 by a clamping screw 52. A torch 54 is slidable in the torch holder 50 and is clamped against sliding movement by a screw 55. A second torch 56 is slidable in a torch holder 57, which is clamped to the supporting bar 36 by a clamping screw 58. The torch 56 is adjustable vertically by a hand-wheel 60, which operates a pinion engaging a rack on the torch. When the clamping screws 52 and 58 are released, the torch holders can be shifted into any position along the supporting bar 36 for making parallel cuts with any desirable spacing. After the torch holders are shifted into positions having the proper spacing, the clamping screws are tightened to lock the torch holders in these positions.

In Fig. 1 the torches are adjusted to cut both flanges from an I-beam as the carriage travels along one flange as a guide. In order to slit the entire length of the beam in one operation, it is necessary for the carriage to start from a point beyond the end of the beam. A platform 65 is placed at the end of the beam so that the surface of the platform provides a continuation of the beam web surface on which the carriage travels. The platform has a flange 66, which provides a continuation of the surface of the beam flange which guides the carriage. The platform 65 is held in place by a clamping plate 68, which clamps against the top surface of the web, and a similar clamping plate (not shown) which clamps against the bottom surface of the web.

In Fig. 1, the apparatus is shown in position to begin a beam-slitting operation. Both torches are slightly beyond the end of the beam. An opening 70 through the platform 65 prevents the torch 54 from burning the platform.

Fig. 2 shows the carriage moving along the beam while the torches cut both flanges from the beam. The rear roller 30 is set out from the side of the carriage further than the forward roller 32. The carriage therefore faces at an angle toward the flange and tends to travel toward the flange, but the rollers 30 and 32, contacting with the flange, cause the carriage to move parallel with the flange. The driving wheels of the carriage slip to a limited extent because the carriage moves in a direction slightly angular to the direction of rotation of the driving wheels. If the thumb-screws 24 and 26 are released, the rear wheels 14 and 16 will caster and roll in the direction of movement of the carriage without slipping.

The carriage is shown provided with rollers 30 and 32 for holding it in a definite spaced relation with respect to the guiding surface, but non-rotary contact faces may be substituted for the rollers.

Fig. 3 shows the carriage 10 equipped with a single torch and cutting a large radius on a plate 72. A guide 74 is secured to the plate by a clamp 75. The rollers 30 and 32 contact with the guide 74 and cause the carriage to travel along the guide. The minimum radius guide which the carriage will follow, in the manner shown in Fig. 3, depends on how far the rear roller 30 is set out from the side of the carriage as compared with the forward roller 32. The carriage will follow a shorter radius guide if one of the wheel carriers, as the carrier 18, is turned at an angle, as shown in Fig. 3, and locked in such position by the thumb-screw 24.

The carriage in Fig. 3 is shown following the outside surface of the guide 74, but it may be used also with the inside wall as a guide.

Figs. 4 and 5 are enlarged views of the carriage, which is similar to the carriage shown in my Patent No. 1,811,835, dated June 30, 1931. The front wheels are secured to an axle 78, which rotates in bearings in the carriage frame. The shaft is operatively connected with a worm-wheel 80 through a clutch 82. The worm-wheel 80 is part of a double reduction gearing 82, which is driven by other reduction gearing 84 connected to an electric motor 85. The motor is equipped with a governor 86 for controlling the speed of the carriage. A speed indicator 88 is secured to the carriage. A handle 90 controls the clutch 82. Further description of the carriage is given in my patent referred to above, but it is unnecessary for a complete understanding of this invention.

The invention has been described in its preferred embodiment, but changes and modifications may be made without departing from the invention as defined in the appended claims.

I claim:

1. A machine for cutting or welding metals, comprising a wheeled torch carriage; a contact face at one side of the carriage near its forward end; another contact face on the same side of the carriage near its rearward end, the line of contact of the faces with a vertical guide surface being at an angle to the plane of rotation of the wheels so that when said faces contact with a vertical guide surface the carriage will tend to travel at an angle toward the guide surface.

2. A machine for cutting or welding metals, comprising a torch carriage; wheels under the carriage supporting it for movement over the work; contact faces on the side of the carriage for operating against a vertical surface, the line of contact of said faces being angular to the line of travel of the carriage when rolling freely on the wheels, the angular relation being such that when the contact faces are against a vertical surface the wheels of the carriage tend to roll angularly toward the vertical surface.

3. A machine for cutting or welding metals, comprising a torch carriage; wheels under the carriage supporting it for movement over the work; contact faces on the side of the carriage for operating against a vertical surface, one of the wheels of the carriage being fixed at an angle to cause the carriage to travel in a circular path so that when the carriage travels along the work with the contact faces against a vertical surface of greater radius than said circular path the carriage tends to travel toward said vertical surface.

4. A machine for cutting or welding metals, comprising a torch carriage; wheels under the carriage supporting it for movement over the work; contact faces on the side of the carriage for operating against a vertical surface; a swivel connection between the carriage and one of the wheels; and locking means for holding the wheel in set positions on its swivel connection so that the carriage tends to travel in a circular path.

5. A machine for cutting or welding metals, comprising a self-supporting torch carriage having wheels supporting it for movement on the surface of the work; and means for guiding the course of the carriage as it travels on the work, said means comprising a bracket detachably connected with the carriage, and rollers supported by the bracket at one side of the carriage in position to roll along a surface normal to the surface of the work.

6. A machine for cutting or welding metals, comprising a self-supporting torch carriage having wheels supporting it for movement on the surface of the work; and means for guiding the course of the carriage as it travels on the work, said means comprising a bracket secured to one side of the carriage, two rollers supported by the bracket with their axes substantially at right angles to the axes of the wheels, the rollers being supported in position to contact with a vertical guide surface as the carriage travels on the surface of the work; and detachable retaining means securing the bracket to the side of the carriage.

7. A machine for cutting or welding metals, comprising a torch carriage; wheels under the carriage for stably supporting and driving it on the surface of the work; and means for guiding the course of the carriage as it travels on the work, said means comprising rollers on one side of the carriage in position to contact with a vertical guide surface as the carriage travels on the surface of the work.

8. A machine for cutting or welding metals, comprising a torch carriage; wheels under the carriage supporting it for movement over the work; and two rollers on one side of the carriage set out from the carriage to contact with a vertical guide surface, one of said rollers being located rearward of the other roller and being set out from the side of the carriage further than the other roller so as to keep the carriage at an angle to the vertical guide surface.

9. A machine for simultaneously cutting two flanges from a beam, comprising a portable carriage including wheels in positions to run on the surface of the beam between the flanges; contact faces on one side of the carriage for contact with one flange of the beam to guide the carriage along the flange; and two torches on the carriage, each of the torches being carried in position to cut off one of the flanges while the carriage travels along the surface of the beam between the flanges.

10. A machine for simultaneously cutting two flanges from a beam, comprising a portable wheeled carriage for traveling along the beam; rollers on one side of the carriage in position to contact with one of the flanges of the beam as the carriage travels along the surface of the beam between the flanges, said rollers holding the carriage at an angle to the contacting flange so that the carriage tends to move toward that flange; a torch holder on the carriage; and two torches supported by the torch holder and adjustable thereon to bring one torch into position to cut off each flange.

11. A machine for simultaneously cutting two flanges from a beam, comprising a portable carriage including wheels in positions to run on the surface of the beam between the flanges; faces on one side of the carriage contacting with one flange of the beam to guide the carriage; a torch holder; and two cutting torches supported by the torch holder and adjustable to vary the distance between the torches to cut off the flanges of beams of different sizes while the carriage travels along the surface of the beam between the flanges.

12. Apparatus for cutting the flange from a beam, including a torch carriage; wheels under the carriage supporting it for movement over the surface of the beam; a torch carried by the carriage in position to cut off the flange of the beam as the carriage moves along the beam; and an extension member having means for clamping on the end of the beam and providing an extended surface at the end of the beam for supporting the carriage so that the torch can travel the full length of the beam.

13. Apparatus for cutting the flange from a beam, including a torch carriage; wheels under the carriage supporting it for movement over the surface of the beam; rollers on the side of the carriage for contact with the flange of the beam to hold the carriage at an angle to the flange so that the carriage tends to move toward the flange as it travels along the beam; a torch holder supported by the carriage; a cutting torch on the holder in position to cut off the flange of the beam; a flanged extension member clamped to the end of the beam and providing an extension of the flange for guiding the carriage, and an extension of the other part of the beam for supporting the carriage, said extension member being of such length that when the carriage is on the extension member the torch is beyond the end of the beam.

14. Apparatus for simultaneously cutting two flanges from a beam, including a portable torch carriage; wheels under the carriage supporting it for movement along the surface of the beam between the flanges; two rollers on one side of the carriage in position to contact with one of the flanges of the beam and hold the carriage at an angle to the flange so that the carriage tends to move toward the flange as it moves along the beam; a torch holder on the forward end of the carriage; two torches on the holder, the torches being adjustable with respect to the carriage so that a torch can be adjusted into position to cut off each of the flanges; an angle plate clamped to the end of the beam providing a continuation of the surface of the beam and supporting the carriage so that the torches start the cut at the extreme end of the beam, said angle plate also providing a continuation of the flange with which the rollers on the side of the carriage contact.

15. A portable cutting or welding apparatus, comprising a wheeled torch carriage for moving over the surface of the work; a torch supported by the carriage for cutting or welding the surface over which the carriage moves; rollers on the side of the carriage; a guide cam resting on the surface of the work and having an upwardly extending surface against which the rollers on the side of the carriage operate to guide the carriage along the cam surface; and fastening means for holding the guide cam in position.

16. A cutting or welding apparatus, including a cam member having an upwardly extending surface; means securing the cam member in position on a piece of work; a wheeled torch carriage for moving over the surface of the work; a torch supported by the carriage in position to cut or weld the work over which the carriage moves; and rollers on the side of the carriage for contact with the upwardly extending surface of the cam member, said rollers being located in position to keep the carriage at an angle to the cam member so that the carriage tends to move toward the cam member and thus follows the contour of the cam member across the work.

17. The combination of a self-supporting, self-propelled torch carriage adapted to travel on an underlying surface, and means for biasing said carriage to hug a lateral guide or flange as it travels.

18. The combination of a self-supporting, self-propelled torch carriage adapted to travel on an underlying surface, and means on the carriage to bear against a lateral guide or flange and keep the carriage at an inclination thereto so that the carriage tends to move toward the guide and follow along said guide while traveling in the direction of the guide.

19. Cutting or welding apparatus including a cam member having an upwardly extending surface, means securing the cam member in position on a supporting surface, a self-supporting, self-propelled torch carriage for moving over said supporting surface, and means to make the carriage tend to travel toward the cam member so that the carriage automatically follows along one side of the cam member as a guide while said carriage travels along the supporting surface.

JAMES L. ANDERSON.